(No Model.)

2 Sheets—Sheet 1.

W. SCOTT.
STRAIGHT WAY VALVE.

No. 302,434. Patented July 22, 1884.

Witnesses:

Inventor:
W. M. Scott
per James Dalzarno
Atty.

(No Model.) 2 Sheets—Sheet 2.
W. SCOTT.
STRAIGHT WAY VALVE.
No. 302,434. Patented July 22, 1884.
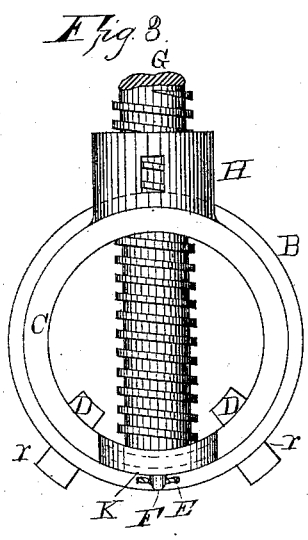
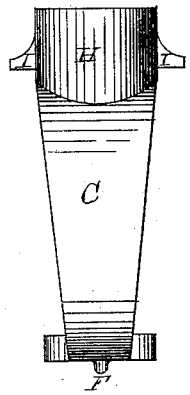

UNITED STATES PATENT OFFICE.

WILLIAM SCOTT, OF DETROIT, MICHIGAN.

STRAIGHT-WAY VALVE.

SPECIFICATION forming part of Letters Patent No. 302,434, dated July 22, 1884.

Application filed November 12, 1883. (No model.)

*To all whom it may concern:*

Be it known that I, WILLIAM SCOTT, of Detroit, in the county of Wayne and State of Michigan, have invented certain Improvements in Valves, of which the following is a specification.

This invention relates to gate or straight-way valves; and it consists, primarily, in a novel arrangement of simple wedge in connection with the gates, the wedge acting at right angles with the faces of the gates to force them to their seats.

The invention further consists in various features and details of construction hereinafter set forth.

Figure 1:
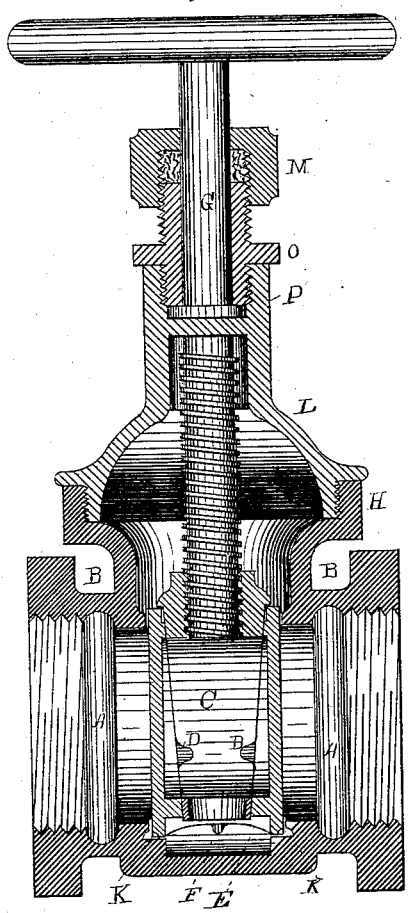
Figure 2:
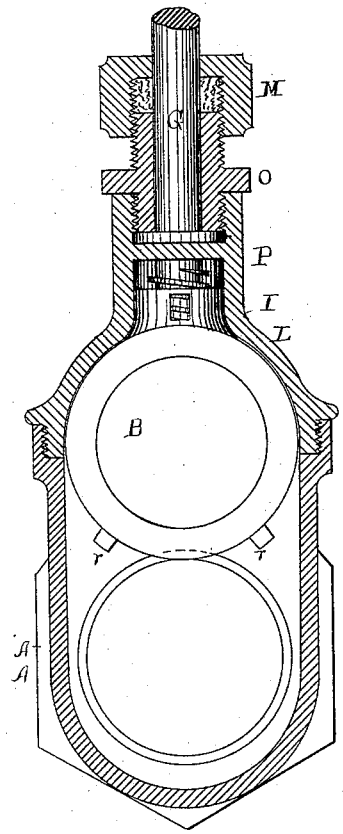

In the accompanying drawings, Figure 1 represents a longitudinal vertical section of a valve embodying this invention. Fig. 2, a vertical transverse section of the same; Fig. 3, a plan of the wedge, one gate or disk, a portion of the screw, and section of the elliptic spring at bottom; Fig. 4, an elevation of the wedge.

Similar letters refer to similar parts in all the drawings.

The object of this invention is to construct a valve in which the disk or disks may be firmly forced against their seat or seats provided in the shell or case, said seats being parallel with each other, without the grinding of the disks against their seats common to valves of this class, and to effect the accurate seating of the disk or disks with few parts.

To this end the invention consists in constructing the valve as represented in the accompanying drawings, in which A represents a shell or case of the substantially usual form, provided with a removable cap, L, a screw-stem, G, for raising or lowering the gates, and a packing-gland, M, applied to the cap L and incircling the screw-stem to prevent leakage, these parts being common to all valves of this class.

C represents the wedge, which consists of a short cylinder, the ends of which, instead of being parallel with one another, form angles with the axis of the cylinder, thereby forming a hollow circular wedge. The said wedge C has a hub or nut, H, formed on its upper or thicker side to receive the screw-stem G. The disks B have also on their inner faces, wedge-pieces formed corresponding with the angles of the wedge C, so that when wedge C is passed between the disks B it forces them apart and holds them firmly against their seats. The disks B have also stops or studs D formed on their inner faces, said stops projecting inside of hollow cylindrical wedge C, as shown in Figs. 1 and 3. The studs D are for the purpose of preventing the disks B from dropping down much in advance of the wedge C. There are also projections I formed upon the hub or nut H of the wedge C, which prevent the disks B from moving horizontally, except in connection with and simultaneous with the wedge C. From this arrangement it will be seen that if the projections D are in contact with the inner surface of wedge C, and projections I in contact with the upper edge of disk B, the wedge and disks might be moved up and down between their seats and no wedging action take place, and consequently the disks B would not be forced against their seats, their faces being parallel with one another. To overcome this there is a little play left between the studs I and the edge of the disk B when studs D are resting on the inner surface of wedge C, and in order to effect the seating of the disks in advance of the wedge there is a small elliptic spring, E, inserted, its ends resting in recesses or on projections on the inner bottom surface of disks B, and kept in place by a small projection, F, on the bottom of wedge C, the tension of the spring E keeping the disks in advance of the wedge until the disks or the projections r on them rest on the bottom of casing A, when the spring will yield to the advancing motion of the wedge, and permit it to descend and force the disks firmly against their seats. It will thus be seen that until the disks reach their proper position opposite their respective seats there is no wedging, and consequently no friction or wear, between the disks and their seats; and so when the screw is reversed to open the gate the spring keeps the disks in position till the limit of the play between the lugs or studs and disks has been reached, and by continuing the motion of the screw the wedge and disks will be raised and the gate opened.

The screw-stem G is provided with a collar, P, working between a shoulder in cap L and the end of a nut or sleeve O, and it prevents longitudinal motion, from which construction it will be seen that as the stem is rotated the wedge C will be raised or lowered, as the case may be.

I am aware that it is not new to construct a valve with a single wedge and one or two disks; neither is it broadly new to use a spring for carrying the disks in advance of the wedging device. I therefore limit my claims to the construction shown.

Having thus described my invention, what is claimed is—

1. In a gate-valve, the combination of a shell or case with two disks having lugs D, and a ring-shaped wedge in which lugs D are inserted, and having lugs I, for the purpose set forth.

2. In a gate-valve, the combination of a shell or case with disks having projections, and a wedge-shaped ring having sockets for the projections, and a spring upon its bottom, said spring having its ends in contact with the disks, substantially as and for the purpose set forth.

WILLIAM SCOTT.

Witnesses:
JAMES DALGANN,
HENRY A. HARMON.